United States Patent
Verma et al.

(10) Patent No.: US 12,314,291 B1
(45) Date of Patent: May 27, 2025

(54) LOSSLESS COMPRESSION OF SYSTEM LOG INFORMATION

(71) Applicant: International Business Machines Corporation, Armonk, NY (US)

(72) Inventors: Mudit Verma, New Delhi (IN); Harshit Kumar, Delhi (IN); Pranjal Gupta, Bhilai (IN); Seep Goel, Bengaluru (IN); Kavya Govindarajan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 18/424,532

(22) Filed: Jan. 26, 2024

(51) Int. Cl.
*G06F 16/00* (2019.01)
*G06F 16/31* (2019.01)

(52) U.S. Cl.
CPC .................. *G06F 16/316* (2019.01)

(58) Field of Classification Search
CPC ..................................... G06F 16/316
USPC ........................................... 707/693
See application file for complete search history.

(56) References Cited

U.S. PATENT DOCUMENTS

| | | | |
|---|---|---|---|
| 7,778,979 B2 | 8/2010 | Hatonen et al. | |
| 11,474,921 B2 * | 10/2022 | Basu | G06F 3/0653 |
| 2016/0098342 A1 | 4/2016 | Faizanullah et al. | |
| 2021/0382746 A1 | 12/2021 | Sharma et al. | |
| 2022/0092102 A1 | 3/2022 | Levy et al. | |

FOREIGN PATENT DOCUMENTS

CN  114968954 A  8/2022

OTHER PUBLICATIONS

Locke et al., "LogAssist: Assisting Log Analysis Through Log Summarization," IEEE Transactions on Software Engineering, May 2021, pp. 1-15.
Fei et al., "SEAL: Storage-efficient Causality Analysis on Enterprise Logs with Query-friendly Compression," Proceedings of the 30th USENIX Security Symposium, Aug. 2021, 19 pages.
Ding et al., "ELISE: A Storage Efficient Logging System Powered by Redundancy Reduction and Representation Learning," Proceedings of the 30th USENIX Security Symposium, Aug. 2021, 19 pages.
Wei et al., "LogGrep: Fast and Cheap Cloud Log Storage by Exploiting both Static and Runtime Patterns," Proceedings of the Eighteenth European Conference on Computer Systems—EuroSys '23, May 2023, pp. 269-285.

(Continued)

*Primary Examiner* — Chelcie L Daye
(74) *Attorney, Agent, or Firm* — Zilka-Kotab, P.C.

(57) ABSTRACT

A computer-implemented method, according to one approach, includes: receiving one or more streams of system log information from one or more microservices, and comparing the received system log information to compressed templates. One or more blocks of the system log information that correspond to one or more of the compressed templates are identified. All static text is removed from the identified blocks. Moreover, runtime variables from the identified blocks are inserted into respective ones of the compressed templates. The streams of system log information are further updated by replacing the identified blocks with the compressed templates having the runtime variables therein.

20 Claims, 7 Drawing Sheets

(56) References Cited

OTHER PUBLICATIONS

Balakrishnan et al., "Lossless Compression for Large Scale Cluster Logs," Proceedings 20th IEEE International Parallel & Distributed Processing Symposium, Apr. 2006, 7 pages.
Feng et al., "MLC: An Efficient Multi-level Log Compression Method for Cloud Backup Systems," IEEE Trustcom/BigDataSE/ISPA, Aug. 2016, pp. 1358-1365.
Uber, "Reducing Logging Cost by Two Orders of Magnitude using CLP," Uber Blog, Sep. 2022, 15 pages, retrieved from https://www.uber.com/en-IN/blog/reducing-logging-cost-by-two-orders-of-magnitude-using-clp/.
Anadiotis, G., "How Netflix built its real-time data infrastructure," VentureBeat, Feb. 17, 2022, 10 pages, retrieved from https://venturebeat.com/data-infrastructure/how-netflix-built-its-real-time-data-infrastructure/.
Zhang et al., "Processing billions of events in real time at Twitter," Twitter Engineering, Oct. 22, 2021, 4 pages, retrieved from https://blog.twitter.com/engineering/en_us/topics/infrastructure/2021/processing-billions-of-events-in-real-time-at-twitter-.
Clemm, J., "A Brief History of Scaling LinkedIn," LinkedIn Engineering, Jul. 20, 2015, 8 pages, retrieved from https://engineering.linkedin.com/architecture/brief-history-scaling-linkedin.
Wang, H., "Scaling Spark Streaming for Logging Event Ingestion," The Airbnb Tech Blog, Nov. 20, 2018, 15 pages, retrieved from https://medium.com/airbnb-engineering/scaling-spark-streaming-for-logging-event-ingestion-4a03141d135d.
Geeksforgeeks, "Trie, What is Trie?" GeeksForGeeks, Feb. 2023, 24 pages, retrieved from https://www.geeksforgeeks.org/trie-insert-and-search/.

\* cited by examiner

LOSSLESS COMPRESSION OF SYSTEM LOG INFORMATION

BACKGROUND

The present invention relates to system log information, and more specifically, this invention relates to lossless compression of system log information.

Data production continues to increase as computing power advances. For instance, the rise of smart enterprise endpoints has led to a significant number of operations being performed by remote systems, along with large amounts of data being generated at remote locations. The production of data will only further increase with the growth of 5G networks and an increased number of connected mobile devices.

As data production increases, so does the overhead associated with processing the larger amounts of data. For instance, costs associated with storing, transferring, and analyzing large volumes of data from multiple cloud environments is a resource intensive process, particularly at edge locations which often have limited resources. The sheer volume of data being produced can thereby make it difficult to identify relevant information as well as distinguish between normal and abnormal behavior. Accordingly, there exists a desire to improve the efficiency by which system behavior is monitored and adjusted over time.

SUMMARY

A computer-implemented method (CIM), according to one approach, includes: receiving one or more streams of system log information from one or more microservices, and comparing the received system log information to compressed templates. One or more blocks of the system log information that correspond to one or more of the compressed templates are identified. All static text is removed from the identified blocks. Moreover, runtime variables from the identified blocks are inserted into respective ones of the compressed templates. The streams of system log information are further updated by replacing the identified blocks with the compressed templates having the runtime variables therein.

A computer program product (CPP), according to another approach, includes: a set of one or more computer-readable storage media. The CPP further includes program instructions that are collectively stored in the set of one or more storage media. The program instructions are for causing a processor set to perform the foregoing CIM.

A computer system (CS), according to yet another approach, includes: a processor set, and a set of one or more computer-readable storage media. The CS further includes program instructions that are collectively stored in the set of one or more storage media. The program instructions are for causing the processor set to perform the foregoing CIM.

Other aspects and implementations of the present invention will become apparent from the following detailed description, which, when taken in conjunction with the drawings, illustrate by way of example the principles of the invention.

DETAILED DESCRIPTION

Figure 1:
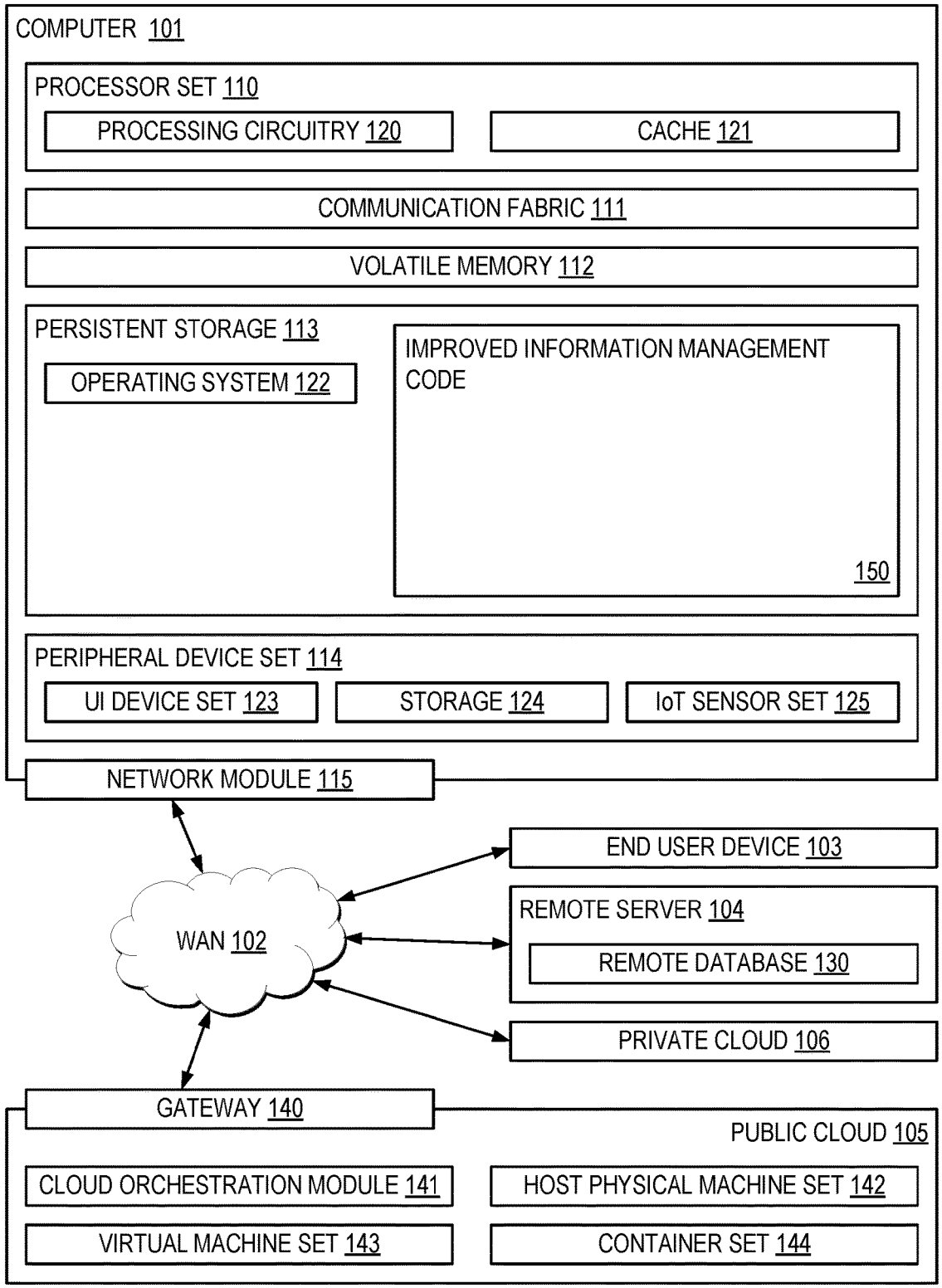
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for developing compressed templates and performing lossless compression of system log information. This allows for system resources to be more efficiently allocated, while retaining the ability to access and utilize original system log information in its entirety. Implementations herein are thereby able to significantly reduce storage capacity and compute overhead consumption. The lossless compression also allows for greater focus to be placed on relevant portions of system log information. Focusing on relevant log information can help identify issues more quickly and accurately than has conventionally been achievable. This leads to faster resolution times and improved system performance, e.g., as will be described in further detail below.

In one general approach, a CIM includes: receiving one or more streams of system log information from one or more microservices, and comparing the received system log information to compressed templates. One or more blocks of the system log information that correspond to one or more of the compressed templates are identified. All static text is removed from the identified blocks. Moreover, runtime variables from the identified blocks are inserted into respective ones of the compressed templates. The streams of system log information are further updated by replacing the identified blocks with the compressed templates having the runtime variables therein.

In another general approach, a CPP includes: a set of one or more computer-readable storage media. The CPP further includes program instructions that are collectively stored in the set of one or more storage media. The program instructions are for causing a processor set to perform the foregoing CIM.

In yet another general approach, a CS includes: a processor set, and a set of one or more computer-readable storage media. The CS further includes program instructions that are collectively stored in the set of one or more storage media. The program instructions are for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved information management code at block 150 for developing compressed templates and performing lossless compression of system log information. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production continues to increase as computing power advances. For instance, the rise of smart enterprise endpoints has led to a significant number of operations being performed by remote systems, along with large amounts of data being generated at remote locations. The production of data will only further increase over time.

As data production increases, so does the overhead associated with processing the larger amounts of data. For instance, costs associated with storing, transferring, and analyzing large volumes of data from multiple cloud environments is a resource intensive process, particularly at edge locations which often have limited resources. The sheer volume of data that is produced can thereby make it difficult to identify relevant information as well as distinguish between normal and abnormal behavior.

This is particularly apparent when dealing with system log information. As will be described in further detail below, system log information may include the records of all the events that occur in a system, in an application, or on a network device. It follows that managing log information from multiple cloud environments is complicated and time-consuming, making it significantly difficult to develop a comprehensive view of system behavior. Accordingly, there exists a desire to improve the efficiency by which system behavior is monitored over time such that performance may be adjusted without consuming a significant amount of resources.

In sharp contrast to the foregoing shortcomings experienced by conventional products, implementations herein are desirably able to significantly reduce storage capacity and compute overhead consumption. These improvements and others are achieved at least in part by performing lossless compression of system log information. This allows for system resources to be more efficiently allocated, while retaining the ability to access and utilize original system log information in its entirety. The lossless compression also allows for greater focus to be placed on relevant portions of system log information. Focusing on relevant log information can help identify issues more quickly and accurately than has conventionally been achievable. This further leads to faster resolution times and improved system performance, e.g., as will be described in further detail below.

Figure 2:
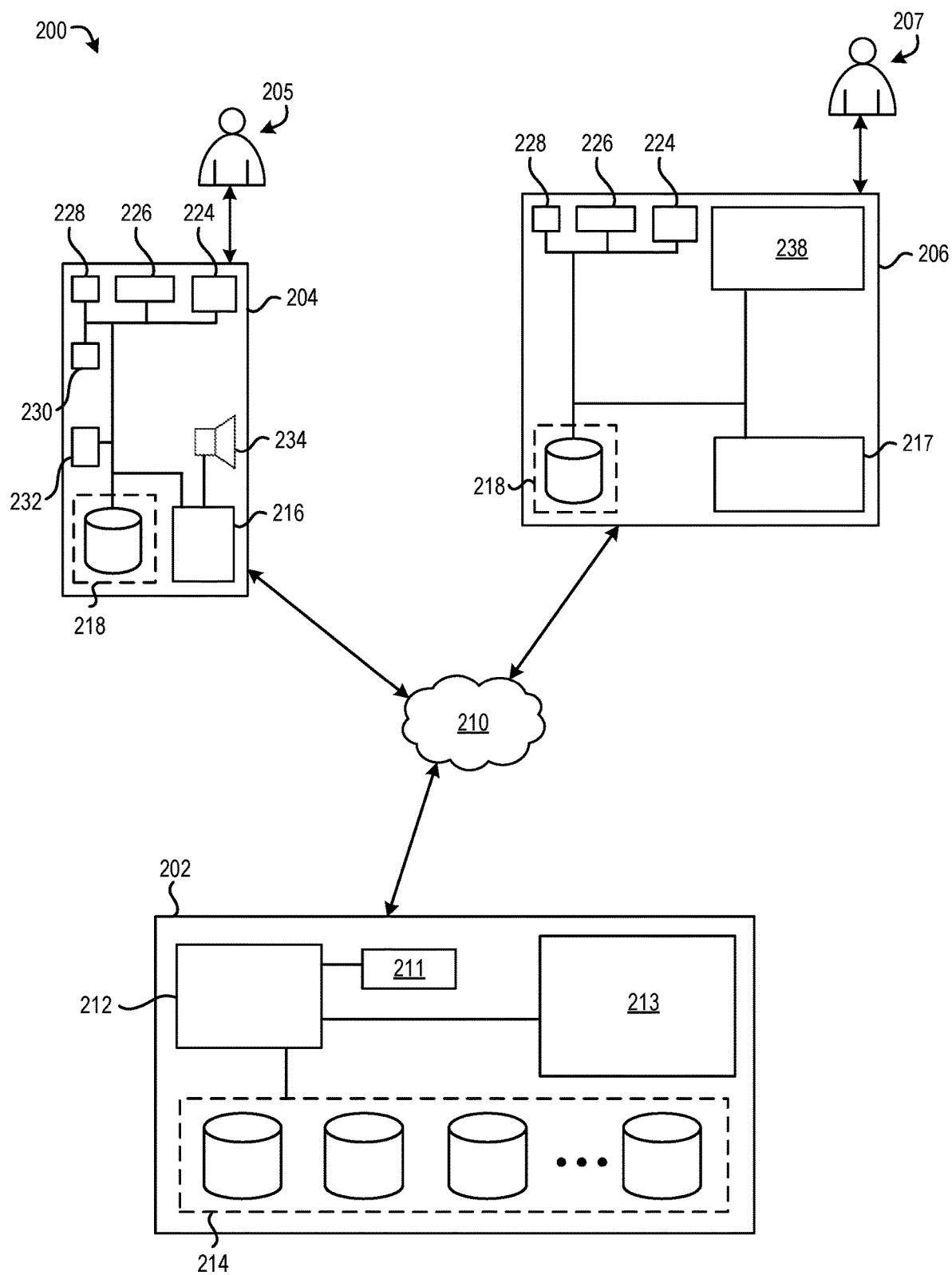
FIG. 2 is a representational view of a distributed system, in accordance with one approach.

Looking now to FIG. 2, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a central server 202 that is connected to a user device 204, and edge node 206 accessible to the user 205 and administrator 207, respectively. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data" and "information" herein is in no way intended to be limiting either, and may include any desired type of details, e.g., depending on the type of operating system implemented on the user device 204, edge node 206, and/or central server 202. For example, video data, audio data, sensor data, images, system log information, etc. may be sent to the central server 202 from user device 204 and/or edge node 206 for processing using one or more artificial intelligence based models, e.g., such as a foundation model and/or machine learning models that are trained to identify patterns in the received information.

With continued reference to FIG. 2, the central server 202 includes a large (e.g., robust) processor 212 coupled to a cache 211, an artificial intelligence module 213, and a data storage array 214 having a relatively high storage capacity. The data storage array 214 may thereby be used to accumulate information over time that may be inspected and evaluated. For instance, the data storage array 214 may be used to accumulate system log information that is received from various programs, applications, microservices, operating systems, etc., that are running at central server 202 and/or at locations connected to the central server 202 over network 210, e.g., such as user device 204 and/or edge node 206. In some approaches, the artificial intelligence module 213 may include any desired number and/or type of artificial intelligence based models that have been trained to identify certain blocks (e.g., portions or collections) of system log information that may be compressed without losing any details, e.g., as will be described in further detail below.

With respect to the present description, "system log information" is intended to include any type of information that is correlated with the operation of a system. In some approaches, the system log information includes data that is stored in system logs, e.g., such as startup messages, operational controls and/or commands, system changes, errors and warnings, etc. It follows that system log information may be received from a source that is in and/or connected to the system 200. For example, system log information may be received from a Security Incident and Event Management (SIEM) system, computational devices, operating systems, etc., that are included in system 200 and/or connected thereto. As noted above, system log information may be received from user device 204, edge node 206, or any other source that is connected to the network 210. The artificial intelligence module 213 and/or processor 212 may thereby be trained in some approaches using historical system log information that has been received over time from applications, microservices, operating systems, etc., that are associated with system 200.

With continued reference to FIG. 2, user device 204 includes a processor 216 which is coupled to memory 218. The user device 204 may receive inputs from, and interface with, user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some data may be received from user 205 for storage and/or evaluation using artificial intelligence module 213. For instance, system log information may be received as a result of the user 205 using one or more applications, software programs, temporary communication connections, etc. running on the user device 204. According to a non-limiting example, the user 205 may submit one or more commands that result in an application being run at the central server 202 using processor 212. As a result, system log information may be generated and evaluated to determine system performance details, e.g., as would be appreciated by one skilled in the art after reading the present description.

Looking now to the edge node 206 of FIG. 2, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an artificial intelligence module 238. As described above with respect to artificial intelligence module 213, the artificial intelligence module 238 may include any desired number and/or type of machine learning models that have been trained to identify specific blocks of system log information. It follows that artificial intelligence module 238 may implement similar, the same, or different characteristics as artificial intelligence module 213 in central server 202.

Figure 3A:
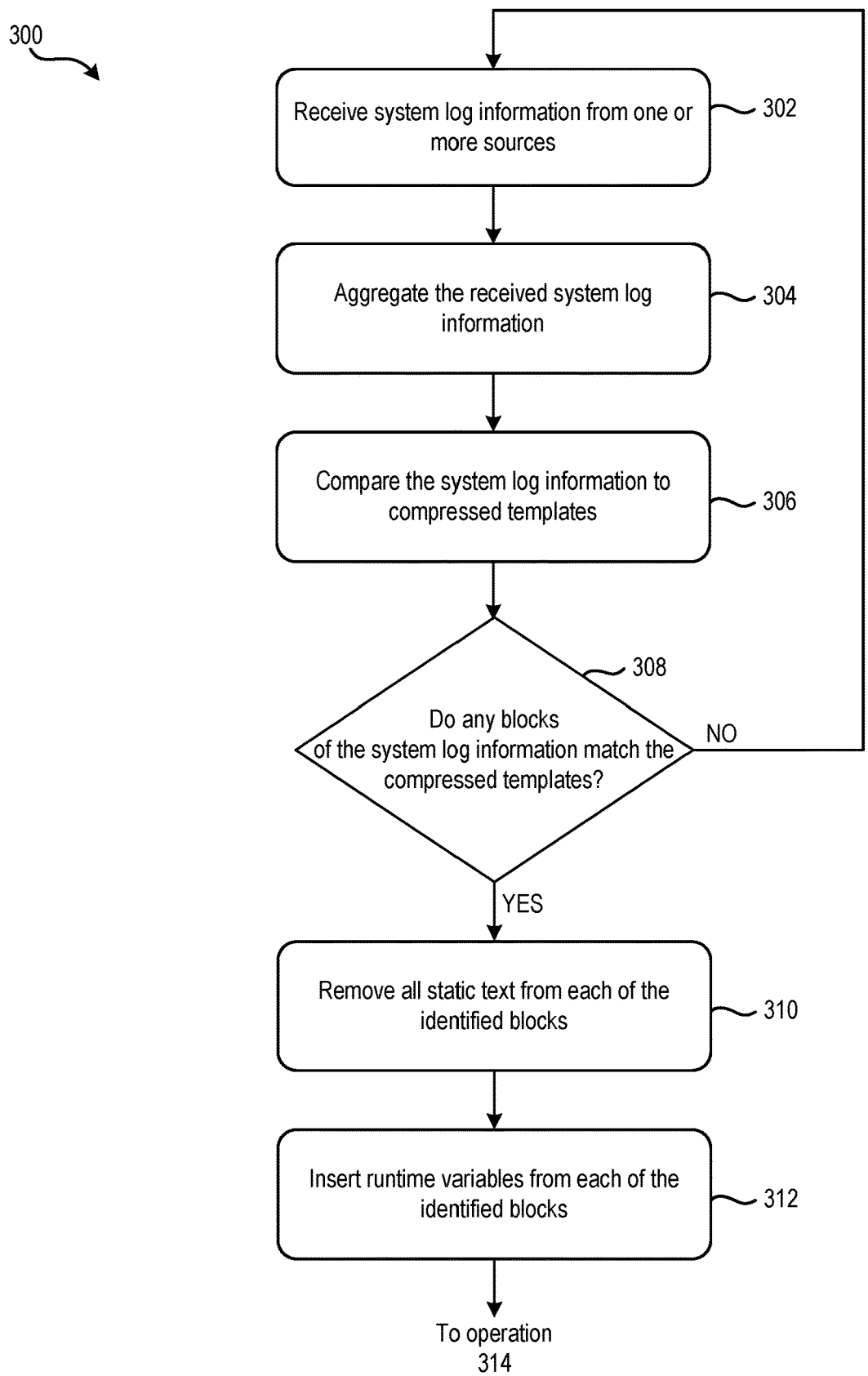
FIG. 3A is a flowchart of a method, in accordance with one approach.
Figure 3A:
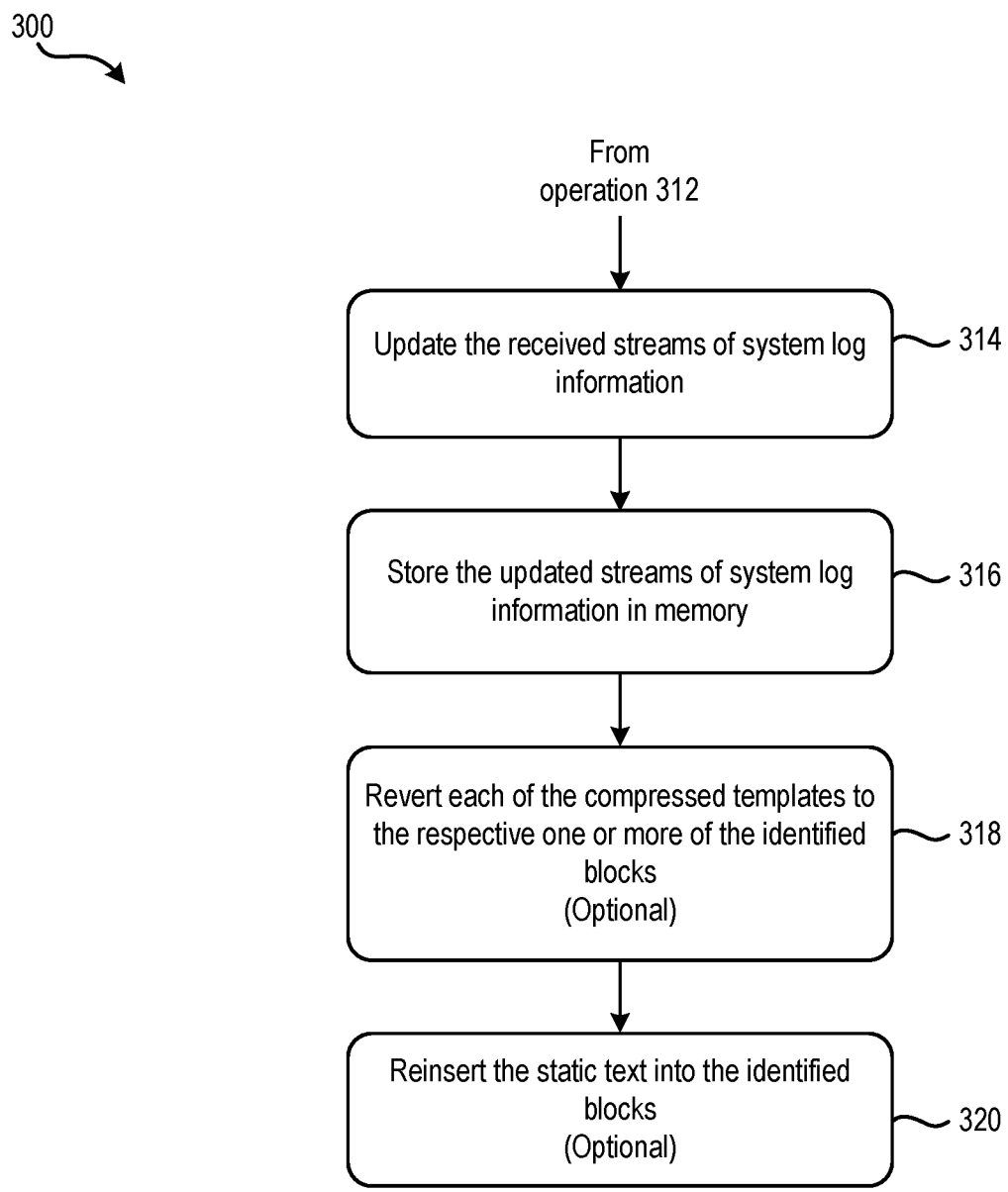
Figure 3B:
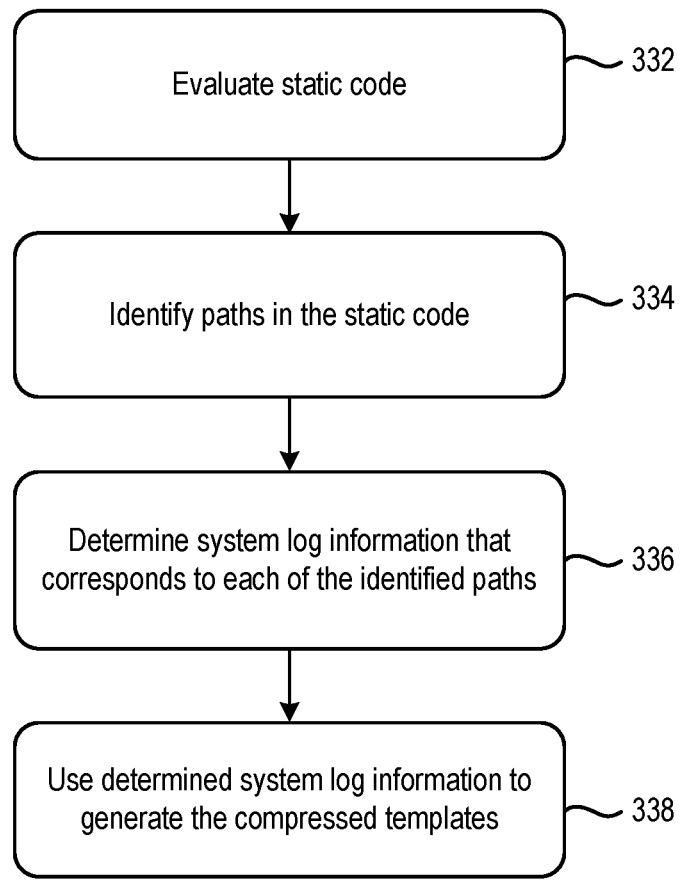
FIG. 3B is a flowchart of a method, in accordance with one approach.
Figure 3C:
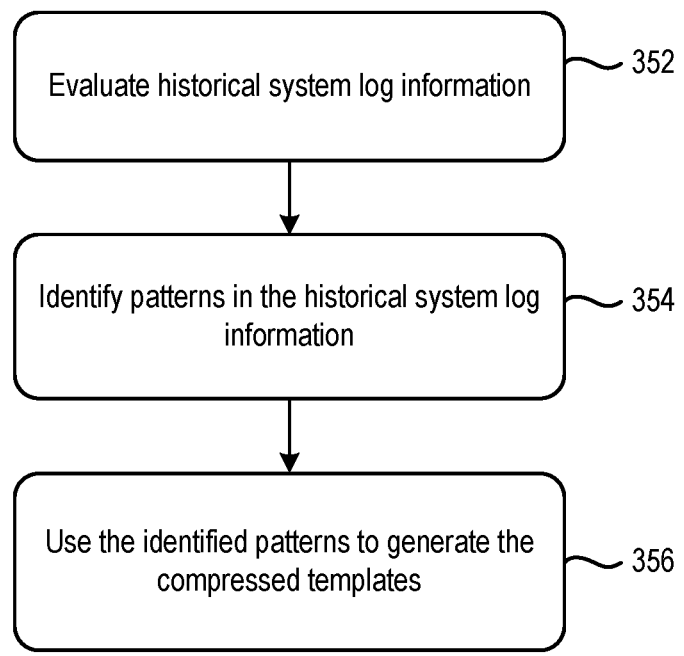
FIG. 3C is a flowchart of a method, in accordance with one approach.

Looking now to FIGS. 3A-3C, flowcharts of computer-implemented methods 300, 330, 350 for developing compressed templates and using the compressed templates to perform lossless compression of system log information are illustrated in accordance with some approaches. Any of methods 300, 330, 350 may be performed in accordance with the present invention in any of the environments depicted in FIGS. 1-2, among others, in various approaches.

Of course, more or less operations than those specifically described in FIGS. 3A-3C may be included in methods 300, 330, 350, as would be understood by one of skill in the art upon reading the present descriptions. Each of the steps of the methods 300, 330, 350 may be performed by any suitable component of the operating environment using known techniques and/or techniques that would become readily apparent to one skilled in the art upon reading the present disclosure. In some approaches, one or more processors located at a central server of a distributed system (e.g., see processor 212 of FIG. 2 above) and/or an artificial intelligence based module (e.g., see artificial intelligence based module 213 of FIG. 2 above) may be used to perform one or more of the operations in any of methods 300, 330, 350. In another approach, one or more processors located at an edge server (e.g., see controller 217 of FIG. 2 above) and/or an artificial intelligence based module (e.g., see artificial intelligence based module 238 of FIG. 2 above) may be used to perform one or more of the operations in any of methods 300, 330, 350. In still another approach, one or more processors located at a user device (e.g., see processor 216 of FIG. 2 above) may be used to perform one or more of the operations in any of methods 300, 330, 350.

Moreover, in various approaches, any of the methods 300, 330, 350 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the methods 300, 330, 350. Illustrative processors include, but are not limited to, a central processing unit (CPU), an application specific integrated circuit (ASIC), a field programmable gate array (FPGA), etc., combinations thereof, or any other suitable computing device known in the art.

Looking first to FIG. 3A, a flowchart of a method 300 for applying compressed templates in order to achieve lossless compression of system log information. Accordingly, operation 302 includes receiving system log information from one or more sources. As noted above, "system log information" includes any type of information that is correlated with the operation of a system. Thus, system log information may be received over time from one or more microservices that are running (e.g., operating) on a given operating system. System log information may also be received from applications, programs, operating systems, etc., depending on the approach. In some approaches, the system log information includes data that is stored in system logs, e.g., such as startup messages, operational controls and/or commands, system changes, errors and warnings, etc. For example, system log information may be received from a Security Incident and Event Management (SIEM) system, computational devices, operating systems, etc. With respect to the present description, "microservices" are intended to refer to portions (e.g., segments) of a computer software application that may be able to communicate with each other. As noted above, the word "microservices" is intended to be interpreted as inclusive of larger "services" regardless of size.

In response to receiving the system log information, operation 304 includes aggregating the received system log information. In other words, operation 304 includes storing the system log information in memory. The system log information may be written directly to memory as it is received in some approaches. In other approaches, the system log information may be temporarily stored in a buffer (e.g., a write buffer) and written to memory in blocks (e.g., such as RAM).

Proceeding to operation 306, the method 300 includes comparing the system log information to compressed templates. In some approaches, the system log information is compared to the compressed templates in real-time as it is received. In some approaches, batches of the system log information is compared to the compressed templates in response to a predetermined amount of the system log information being received, in response to receiving one or more instructions from a user, in response to a predetermined condition being satisfied, in response to system log information not being received for a predetermined amount of time since a last portion of system log information was received, etc.

Each of the compressed templates correspond to a respective pattern identified as being associated with system log information. In other words, the compressed templates provide learned insight to the system log information. Each compressed template may thereby correspond to a specific block (e.g., combination) of system log information, and even assigns a block identifier to the respective block of system log information. It follows that a "compressed template" as used herein includes a block identifier unique to the respective block of system log information, as well as the ability to record any runtime variables that are present in an identified block of system log information. A block identifier may thereby be used to at least partially replace each block of system log information. In other words, the identified relationship between the compressed templates and the respective blocks of system log information allows for lossless compression to be performed on the system log information.

The compressed templates may be generated while the system is offline (e.g., not producing new system log information) and/or at a location removed from the system producing the system log information. According to some approaches, compressed templates are generated based on patterns identified in the static code of one or more microservices that generated the system log information (e.g., see FIG. 3B below). These patterns may thereby be used to identify similar or the same portions of newly received system log information. By replacing these identified portions of the new system log information with the respective compressed templates, lossless compression is achieved.

According to an in-use example, which is in no way intended to be limiting, the following lines of static code may be identified as a repeating (e.g., frequent) block produced by one or more microservices: Starting authentication process for user Alice.

User Alice exists in the system.
    Password mismatch for user Alice.
    Authentication failed for user Alice.

The lines of static code may thereby be used to produce the following compressed template:

autheticate_user_incorrect_password, <Username>

According to the present in-use example, the compressed template has a block identifier of "autheticate_user_incorrect_password" which represents the static text portion of the foregoing block of static code. The compressed template also includes a <Username> section that may be used to indicate the value of a runtime variable present in the block of static code. In the present in-use example the runtime variable is "Alice." Again, by using these compressed templates to replace identified portions of the new system log information achieves lossless compression.

In other approaches, compressed templates are generated based on patterns previously identified in historical system log information that was generated by a same or different microservice (e.g., see FIG. 3C below). Again, these patterns may be used to identify similar or the same portions of newly received system log information. Moreover, by replacing these identified portions of the new system log information with the respective compressed templates, lossless compression is achieved.

As noted above, the compressed templates provide learned insight to the system log information. This relationship between the compressed templates and the system log information allows for lossless compression to be performed on the system log information by replacing each predetermined blocks of system log information with a respective compressed template. Thus, operation 308 includes determining whether any blocks of the system log information correspond to one or more of the compressed templates. In other words, operation 308 includes determining whether any portions of the system log information received in operation 302 match the patterns identified to generate the compressed templates.

In response to determining that none of the system log information matches the patterns that are correlated with the compressed templates, method 300 returns to operation 302 such that additional system log information may be received, and system performance may continue to be monitored. However, in response to determining that at least one block (e.g., portion) of the received system log information does match the patterns correlated with the compressed templates, method 300 proceeds to operation 310.

There, operation 310 includes removing all static text from the identified block(s). Moreover, operation 312 includes inserting runtime variables from each of the identified blocks into respective ones of the compressed templates. Operations 310 and 312 thereby effectively strips each of the identified blocks of all the static text in the system log information and transforms each of the blocks to contain only an identifier assigned to the respective block and any runtime variables that are present in the system log information. Again, by using these compressed templates to replace identified portions of the new system log information achieves lossless compression.

Proceeding to operation 314, the received streams of system log information are updated. The received streams are updated by replacing the identified blocks with the compressed templates having the runtime variables therein. In other words, operation 314 includes replacing predetermined instances in the received system log information with compressed representations without losing any details, thereby achieving lossless compression. Moreover, by storing the relationship between blocks of system log information and the respective compressed templates, decompression may be performed as desired to return the information back to an original state (e.g., as it was received). It follows that any replacements that are made in the originally received system log information are preferably recorded (e.g., in a lookup table) and stored in memory. The relationships between the blocks of system log information and the compressed templates are also preferably stored in memory. In some approaches, which are in no way intended to be limiting, the aforementioned replacements and/or relationships between the system log information and the compressed templates may be stored in a trie data structure. Thus, at runtime a desired block of system log information may be located in the trie data structure similar to locating a word in the trie data structure, e.g., as would be appreciated by one skilled in the art after reading the present description.

These replacements and/or relationships may further be transmitted (e.g., copied and sent) to remote locations that may receive the compressed stream of system log information. This allows remote locations to interpret the compressed information as well as perform lossless decompression, e.g., as would be appreciated by one skilled in the art after reading the present description.

Operation 316 further includes storing the updated streams of system log information in memory. In other words, operation 316 includes storing the compressed streams of system log information in memory, thereby consuming less storage capacity than if the original streams of system log information were stored directly in memory without compression. The compressed streams of system log information may also be sent to remote locations. In one approach, a compressed stream of system log information may be transferred over a network. For example, a copy of a compressed stream of system log information may be transferred over a network to a cloud storage location where it is retained as a backup copy. In another example, a copy of a compressed stream of system log information may be transferred over a network to a remote compute location for further processing, to train one or more machine learning models, for analysis to improve the accuracy of the compressed templates, etc.

As noted above, the compressed system log information may optionally be returned to an initial, uncompressed state without experiencing any loss of detail. In other words, the system log information compression is lossless and reversible in order to return the system log information to an original state (e.g., as it was generated and/or received). This is particularly desirable, as the system log information may be compressed while stored in memory to reduce storage capacity consumption, and decompressed to an initial state without losing any of the information.

Accordingly, optional operation 318 includes modifying the updated streams of system log information by reverting each of the compressed templates to the respective one or more of the identified blocks. Moreover, optional operation 320 includes reinserting the static text into the identified blocks. It follows that optional operations 318, 320 are able to achieve a lossless reversion of the compressed system log information back to its original form. Depending on the approach, optional operations 318, 320 may be performed in response to receiving one or more instructions from a user, in response to a predetermined condition being met (e.g., an amount of available storage capacity being increased above a predetermined threshold), in response to receiving a request to analyze the system log information in its entirety, to use the complete system log information as training data for one or more machine learning models, etc.

As noted above, the compressed templates may be formed using different types of source information depending on the approach. Each of the compressed templates that are developed correspond to a respective pattern identified as being associated with system log information. In other words, the compressed templates provide insight to the system log information. According to some approaches, compressed templates are generated based on patterns identified in the static code of one or more microservices that generated the system log information (e.g., see FIG. 3B below). In other approaches, compressed templates are generated based on patterns previously identified in system log information generated by a same or different microservice (e.g., see FIG. 3C below).

Referring now to FIG. 3B, a flowchart of a computer-implemented method 330 for generating compressed templates are illustrated in accordance with one approach. It follows that one or more of the operations in method 330 may be performed to develop the compressed templates that are used to perform operation 306 of FIG. 3A. Method 330 may also be performed in accordance with the present invention in any of the environments depicted in FIGS. 1-2, among others, in various approaches.

Of course, more or less operations than those specifically described in FIG. 3B may be included in method 330, as would be understood by one of skill in the art upon reading the present descriptions. Each of the steps of the method 330 may be performed by any suitable component of the operating environment using known techniques and/or techniques that would become readily apparent to one skilled in the art upon reading the present disclosure.

Moreover, in various approaches, method 330 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 330. Illustrative processors include, but are not limited to, a central processing unit (CPU), an application specific integrated circuit (ASIC), a field programmable gate array (FPGA), etc., combinations thereof, or any other suitable computing device known in the art.

As noted above, some approaches involve generating compressed templates based on patterns identified in the static code of one or more microservices that generated the system log information. The operations of method 330 may thereby be performed in situations where access to the static code of microservices, applications, programs, operating systems, etc. that produced the system log information is permitted. Accordingly, operation 332 includes evaluating static code that is correlated with the microservices, applications, programs, operating systems, etc. that produce system log information. In other words, operation 332 includes inspecting the static code that ultimately produced the system log information. However, it should be noted that the static code may correspond to microservices, applications, programs, operating systems, etc. that are the same as, similar to, or different than the microservices, applications, programs, operating systems, etc. from which the system log information is received from during runtime (e.g., see operation 302 of FIG. 3A above).

From operation 332, method 330 advances to operation 334. There, operation 334 includes identifying paths in the static code. In some approaches, the paths in the static code may be identified using a symbolic execution tool to perform path enumeration on the static code. However, other tools and/or processes may be used to identify the paths in the static code.

In response to identifying paths in the static code, method 330 advances to operation 336. There, operation 336 includes determining system log information that corresponds to each of the identified paths. In other words, operation 336 includes identifying the type, amount, location, etc., of system log information that is produced (or at least expected to be produced) by the identified paths in the static code. Operation 336 is thereby able to make educated predictions on the system log information that will be produced by the static code in a given microservice, application, program, operating system, etc. This insight provides significant value in identifying system log information that may be reduced to a compressed template (having a block identification and runtime variables rather than all the details of the system log information). The insight may also be used to predict failures, errors, and other types of undesirable status information that may appear as "anomalies" in the system log information over time.

Referring still to FIG. 3B, method 330 advances from operation 336 to operation 338 in response to identifying the relevant system log information. There, operation 338 includes using determined system log information to generate the compressed templates. In some approaches, the process of generating a compressed template includes assigning a block identifier to each block of system log information identified as corresponding to the identified paths in the static code. The block identifier may effectively serve as a compressed representation of at least the static information found in the respective block of system log information. Accordingly, the process of generating a compressed template also includes incorporating any runtime variables identified as corresponding to the identified paths in the static code. As noted above, runtime variables may include any non-fixed values in the system log information that change depending on the particular situation. It follows that each compressed template preferably includes a block identifier and is configured to implement (e.g., indicate) the values of any runtime variables identified in the system log information. Again, this allows for lossless compression to be achieved.

Referring now to FIG. 3C, a flowchart of a computer-implemented method 350 for generating compressed templates are illustrated in accordance with another approach. It follows that one or more of the operations in method 350 may be performed to develop the compressed templates that are used to perform operation 306 of FIG. 3A. Method 350 may also be performed in accordance with the present invention in any of the environments depicted in FIGS. 1-2, among others, in various approaches.

Of course, more or less operations than those specifically described in FIG. 3C may be included in method 350, as would be understood by one of skill in the art upon reading the present descriptions. Each of the steps of the method 350 may be performed by any suitable component of the operating environment using known techniques and/or techniques that would become readily apparent to one skilled in the art upon reading the present disclosure.

Moreover, in various approaches, method 350 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As noted above, some approaches involve generating compressed templates based on patterns identified in the actual system log information that is produced by one or more microservices. The operations of method 350 may thereby be performed in situations where access is permitted to historical system log information previously generated by one or more microservices, applications, programs, operating systems, etc. Accordingly, operation 352 includes evaluating historical system log information. In some approaches, the historical system log information may have been produced by the same microservices that are being evaluated at runtime. In other approaches, the historical system log information may have been produced by similar or different microservices that may be running on the same or different operating system(s).

From operation 352, method 350 advances to operation 354. There, operation 354 includes identifying patterns in the historical system log information. In some approaches, repeating patterns in the historical system log information may be identified using sequence mining. However, other tools and/or processes may be used to identify repeating patterns in the historical system log information.

The amount of historical system log information that repeats in a given block may vary depending on the approach. For instance, in some approaches a single line of system log information may be identified as repeating in the historical data. In such approaches, the single line of system log information may be identified as a block that repeats. However, in other approaches, two, three, four, five, ten, fifteen, twenty, twenty-five, thirty, forty, fifty, sixty, etc. lines of system log information may be identified as repeating in the historical data. It follows that a block of repeating system log information may be of any size, e.g., depending on the particular approach.

It should also be noted that the number of times a given block of system log information appears in the historical data before it is considered a repeating block may vary. In some approaches, storage capacity in memory may be limited. In such approaches, the number of times a block of system log information appears in historical data before qualifying as a "repeating block" may be lower than in approaches having more robust memory storage capacity. In other approaches, a user may identify certain types of system log information as being less significant than other types of system log information, thereby impacting the number of entries that qualify a block of system log information as repeating.

In response to identifying one or more patterns in the historical system log information, method 350 advances to operation 356. There, operation 356 includes using the identified patterns to generate the compressed templates. In some approaches, the process of generating a compressed template includes assigning a block identifier to each block in the historical system log information identified as repeating. The block identifier may effectively serve as a compressed representation of the information found in the respective block of system log information. Accordingly, the process of generating a compressed template also includes incorporating any runtime variables identified in the repeating system log information. As noted above, runtime variables may include any non-fixed values in the system log information that change depending on the particular situation. It follows that each compressed template preferably includes a block identifier and is configured to implement (e.g., indicate) the values of any runtime variables identified in the system log information. Again, this allows for lossless compression to be achieved.

In some approaches, system log information may include sensitive information. Although compressing the system log information as described in approaches herein involves replacing the information with a block identifier and values for any runtime variables, it may be undesirable for the compressed templates to be stored in an easily accessible and/or readable manner. Accordingly, in some approaches the process of forming compressed templates may further include encrypting the system log information in a given block and using the resulting hash value as the block identification. Similarly, the runtime variable values may be encrypted and represented in the resulting compressed template as a hash value or similar type of encrypted string of characters. This further improves the security of the system log information, allowing it to be stored in public repositories without exposing any of the underlying information, e.g., as would be appreciated by one skilled in the art after reading the present description.

According to some approaches, the compressed system log information may be inspected for anomalies, and the decompression may be performed in response to detecting one or more anomalies. In other words, the compressed system log information may be inspected to determine whether any system log information is received from a microservice, application, program, operating system, etc., that is abnormal, or which indicates an issue may be present. By inspecting the compressed system log information, processing overhead and latency is significantly reduced such that anomalies may be detected much more efficiently than has conventionally been achievable. These improvements are further compounded by the steady increase in the amount of system log information being produced over time. Improvements may even further be compounded by combining the approaches herein with one or more trained machine learning models that are able to analyze the compressed system log information for indications of errors, e.g., based on a trained understanding of how the system typically (e.g., nominally) operates.

Figure 3D:
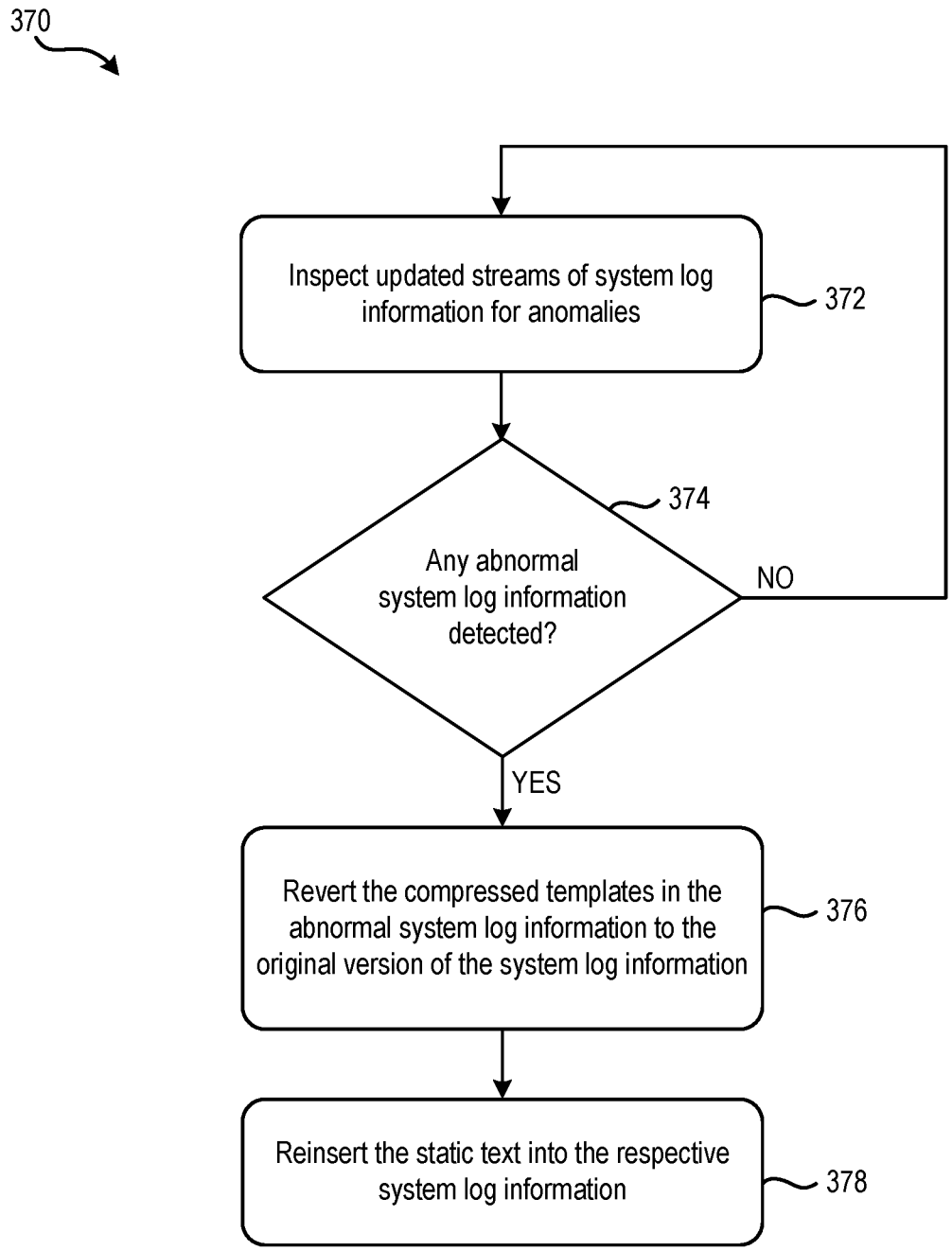
FIG. 3D is a flowchart of a method, in accordance with one approach.

Referring momentarily now to FIG. 3D, a flowchart of a computer-implemented method 370 for inspecting compressed streams of system log information for anomalies is illustrated in accordance with one approach. Method 370 may be performed in accordance with the present invention in any of the environments depicted in FIGS. 1-2, among others, in various approaches.

Of course, more or less operations than those specifically described in FIG. 3D may be included in method 370, as would be understood by one of skill in the art upon reading the present descriptions. Each of the steps of the method 370 may be performed by any suitable component of the operating environment using known techniques and/or techniques that would become readily apparent to one skilled in the art upon reading the present disclosure.

Moreover, in various approaches, method 370 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 370. Illustrative processors include, but are not limited to, a central processing unit (CPU), an application specific integrated circuit (ASIC), a field programmable gate array (FPGA), etc., combinations thereof, or any other suitable computing device known in the art.

As shown, method 370 includes inspecting updated streams of system log information for anomalies. See operation 372. In other words, operation 372 includes examining the compressed system log information and determining whether any of the uncompressed portions are abnormal. With respect to the present description, "anomalies" and "abnormal" are intended to refer to system log information that is not commonly found during the course of operation for the microservice, application, program, operating system, etc. that produced the system log information. In some approaches, abnormal system log information may include one or more known entries that have been identified as corresponding to errors or other situations that call for more detailed analysis and/or inspection. In other approaches, abnormal system log information may include entries that have not been previously produced. Again, examining the compressed system log information improves the efficiency by which such abnormalities may be detected and addressed. It follows that the compressed system log information is useful even while in the compressed state. In other words, the system log information need not be converted back to its uncompressed form in order to perform evaluations or detect anomalies. This improves compute overhead and throughput by reducing the amount of information that is processed as a whole.

Operation 374 further includes determining whether any abnormal system log information is detected. In response to determining that no abnormal system log information has been detected, method 370 returns to operation 372 such that additional system log information may be inspected. However, method 370 advances to operation 376 in response to determining that abnormal system log information has been detected. There, operation 376 includes reverting the compressed templates in the abnormal system log information to the original version of the system log information. In other words, operation 376 includes replacing the block identifier in the compressed stream of system log information with the actual block of system log information itself. Operation 378 further includes reinserting the static text into the respective system log information. Operations 376 and 378 are thereby able to effectively decompresses the system log information without experiencing any loss of the initial system log information. Method 370 is thereby able to achieve a lossless reversion of the compressed log information back to its original form.

It follows that approaches herein are desirably able to perform an offline analysis to identify blocks of system log information that typically co-occur. This analysis can be done using static code (e.g., performing binary analysis) in some approaches, and/or using historical system log information in other approaches. For instance, performing sequence mining of windowed system log information allows for patterns of lines that co-occur to be identified and represented with a block identification. The system may thereby assign a respective block identifier to each of these identified blocks of system log information.

During runtime, a system is able to scan incoming system log information to identify occurrences of system log information that have been predetermined as being of interest. The system is thereby able to strip the identified block(s) of all the static text in the loglines of the system log information and transform the block(s) to contain only the respective block identifier(s) and the respective runtime variables found in the loglines. These transformed blocks represent the compressed logs, and may be stored and/or transferred (e.g., to remote locations over a network). At any point, the static text can be refilled to return to the original block of system log information, making the whole process completely lossless.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
receiving one or more streams of system log information from one or more microservices;
comparing the system log information to compressed templates;
identifying one or more blocks of the system log information that correspond to one or more of the compressed templates;
removing all static text from the identified blocks;
inserting runtime variables from the identified blocks into respective ones of the compressed templates; and
updating the streams of system log information by replacing the identified blocks with the compressed templates having the runtime variables therein.

2. The CIM of claim 1, wherein the compressed templates are formed by:
evaluating static code correlated with the microservices and/or other microservices;
identifying paths in the static code;
determining system log information that corresponds to each of the identified paths; and
using the determined system log information to generate the compressed templates.

3. The CIM of claim 2, wherein the identifying of the paths in the static code includes:
using a symbolic execution tool to perform path enumeration on the static code.

4. The CIM of claim 1, wherein the compressed templates are formed by:
evaluating historical system log information produced by the microservices and/or other microservices;
identifying patterns in the historical system log information; and
using the identified patterns to generate the compressed templates.

5. The CIM of claim 4, wherein the identifying of the patterns in the historical system log information includes:
    using sequence mining to evaluate the historical system log information.

6. The CIM of claim 1, further comprising:
    inspecting the updated streams of system log information for anomalies; and
    in response to identifying an anomaly:
        reverting one of the compressed templates to a respective one of the identified blocks, and
        reinserting the static text into the respective one of the identified blocks.

7. The CIM of claim 1, further comprising:
    modifying the updated streams of system log information by reverting each of the compressed templates to the respective one or more of the identified blocks; and
    reinserting the static text into the identified blocks.

8. The CIM of claim 1, further comprising:
    storing the updated streams of system log information in memory.

9. The CIM of claim 1, further comprising:
    transferring the updated streams of system log information over a network.

10. A computer program product (CPP), comprising:
    a set of one or more computer-readable storage media; and
    program instructions, collectively stored in the set of one or more storage media, for causing a processor set to perform the following computer operations:
        receive one or more streams of system log information from one or more microservices;
        compare the system log information to compressed templates;
        identify one or more blocks of the system log information that correspond to one or more of the compressed templates;
        remove all static text from the identified blocks;
        insert runtime variables from the identified blocks into respective ones of the compressed templates; and
        update the streams of system log information by replacing the identified blocks with the compressed templates having the runtime variables therein.

11. The CPP of claim 10, wherein the compressed templates are formed by:
    evaluating static code correlated with the microservices and/or other microservices;
    identifying paths in the static code;
    determining system log information that corresponds to each of the identified paths; and
    using the determined system log information to generate the compressed templates.

12. The CPP of claim 11, wherein the identifying of the paths in the static code includes:
    using a symbolic execution tool to perform path enumeration on the static code.

13. The CPP of claim 10, wherein the compressed templates are formed by:
    evaluating historical system log information produced by the microservices and/or other microservices;
    identifying patterns in the historical system log information; and
    using the identified patterns to generate the compressed templates.

14. The CPP of claim 13, wherein the identifying of the patterns in the historical system log information includes:
    using sequence mining to evaluate the historical system log information.

15. The CPP of claim 10, wherein the program instructions are for causing the processor set to further perform the following computer operations:
    inspect the updated streams of system log information for anomalies; and
    in response to identifying an anomaly:
        revert one of the compressed templates to a respective one of the identified blocks, and
        reinsert the static text into the respective one of the identified blocks.

16. The CPP of claim 10, wherein the program instructions are for causing the processor set to further perform the following computer operations:
    modify the updated streams of system log information by reverting each of the compressed templates to the respective one or more of the identified blocks; and
    reinsert the static text into the identified blocks.

17. The CPP of claim 10, wherein the program instructions are for causing the processor set to further perform the following computer operations:
    store the updated streams of system log information in memory; and
    transfer the updated streams of system log information over a network.

18. A computer system (CS), comprising:
    a processor set;
    a set of one or more computer-readable storage media;
    program instructions, collectively stored in the set of one or more storage media, for causing the processor set to perform the following computer operations:
        receive one or more streams of system log information from one or more microservices running on an operating system;
        compare the system log information to compressed templates;
        identify one or more blocks of the system log information that correspond to one or more of the compressed templates;
        remove all static text from the identified blocks;
        insert runtime variables from the identified blocks into respective ones of the compressed templates; and
        update the streams of system log information by replacing the identified blocks with the compressed templates having the runtime variables therein.

19. The CS of claim 18, wherein the compressed templates are formed by:
    evaluating static code correlated with the microservices and/or other microservices;
    identifying paths in the static code using a symbolic execution tool, wherein the symbolic execution tool is configured to perform path enumeration on the static code;
    determining system log information that corresponds to each of the identified paths; and
    using the determined system log information to generate the compressed templates.

20. The CS of claim 18, wherein the compressed templates are formed by:
    evaluating historical system log information produced by the microservices and/or other microservices;
    identifying patterns in the historical system log information using sequence mining; and
    using the identified patterns to generate the compressed templates.

* * * * *